United States Patent
Gunji et al.

(10) Patent No.: US 9,141,212 B2
(45) Date of Patent: Sep. 22, 2015

(54) DISPLAY DEVICE WITH TOUCH PANEL

(71) Applicant: Japan Display Inc., Mobara-shi, Chiba-ken (JP)

(72) Inventors: Masakazu Gunji, Mobara (JP); Tsutomu Sato, Mobara (JP); Yasuaki Kondo, Mobara (JP); Kengo Okazaki, Mobara (JP); Takashi Ueno, Chosei (JP)

(73) Assignee: JAPAN DISPLAY INC., Tokyo (JP)

( * ) Notice: Subject to any disclaimer, the term of this patent is extended or adjusted under 35 U.S.C. 154(b) by 235 days.

(21) Appl. No.: 13/740,407

(22) Filed: Jan. 14, 2013

(65) Prior Publication Data

US 2013/0181922 A1 Jul. 18, 2013

(30) Foreign Application Priority Data

Jan. 18, 2012 (JP) .................................. 2012-008356

(51) Int. Cl.
*G06F 3/041* (2006.01)
*G06F 3/0354* (2013.01)

(52) U.S. Cl.
CPC ............ *G06F 3/041* (2013.01); *G06F 3/03547* (2013.01)

(58) Field of Classification Search
CPC .... G06F 3/0412; G06F 3/044; G02F 1/13338
USPC .................................. 345/173–175
See application file for complete search history.

(56) References Cited

U.S. PATENT DOCUMENTS

| 2003/0222857 | A1* | 12/2003 | Abileah ........................ 345/173 |
| 2008/0042997 | A1 | 2/2008 | Endo |
| 2010/0026662 | A1* | 2/2010 | Oohira ........................ 345/174 |
| 2011/0007410 | A1 | 1/2011 | Honma et al. |
| 2011/0141042 | A1* | 6/2011 | Kim et al. .................... 345/173 |
| 2012/0068959 | A1* | 3/2012 | Kim et al. .................... 345/174 |

FOREIGN PATENT DOCUMENTS

| JP | 2008-47026 | 2/2008 |
| JP | 2009-30029 | 2/2009 |

* cited by examiner

*Primary Examiner* — Koosha Sharifi-Tafreshi
(74) *Attorney, Agent, or Firm* — Lowe Hauptman & Ham, LLP

(57) ABSTRACT

Provided is a display device which includes: a display panel having a display screen on which an image is displayed; and a touch panel which is arranged on a display screen side of the display panel. The display panel includes: a first substrate; a second substrate which is arranged on a side closer to the touch panel than the first substrate; and a polarizer which is arranged on a touch panel side of the second substrate. The touch panel is formed larger than the polarizer and is laminated to the polarizer. An auxiliary member is arranged between the touch panel and a portion of the second substrate which is exposed from the polarizer.

11 Claims, 5 Drawing Sheets

DISPLAY DEVICE WITH TOUCH PANEL

CROSS-REFERENCE TO RELATED APPLICATION

The present application claims priority from Japanese application JP2012-008356 filed on Jan. 18, 2012, the content of which is hereby incorporated by reference into this application.

BACKGROUND OF THE INVENTION

1. Field of the Invention

The present invention relates to a display device with a touch panel.

2. Description of the Related Art

There has been known a display device with a touch panel which detects a position depressed by the finger, a dedicated-use pen or the like. Further, the display device is configured such that, for example, the touch panel is laminated to a display screen side of a display panel such as a liquid crystal display panel.

Further, as one of touch panel systems, there has been known a resistance-film-type touch panel. In the resistance-film-type touch panel, two substrates on which a transparent conductive film is formed respectively are laminated to each other by way of a large number of spacers so that an effective region where a depressed position can be detected is formed into a hollow space. There may be also a case where the touch panel is required to satisfy conditions such as being light-weighted or possessing impact resistance and hence, a film-like member may be also used as a substrate which constitutes a touch panel.

JP2009-30029 A discloses a polyester resin composition which has excellent flexibility (tensile elongation and impact resistance), excellent appearance of a molded product (surface gloss), excellent hydrolysis resistance, and excellent moldability (residence heat stability) while being a thermoplastic resin composition which is filled with inorganic fillers at high density and has highly densified ceramic-tone high-class material quality feeling.

JP2008-47026 A (U.S. Published Patent No. 2008/0042997 A1) discloses a touch panel having a curved shape. The touch panel having a curved shape comprises an upper film substrate and a lower film substrate. Each film substrate are formed from a transparent plastic film having a transparent electrically conductive polymer layer, an electrode, and a wiring pattern formed thereon.

SUMMARY OF THE INVENTION

In advancing the narrowing of a picture frame of a display device with a touch panel, it may be considered that an area of a polarizer arranged on a display panel is made as small as possible so as to narrow a region of a polarizer which occupies in a picture frame region of the display panel.

However, when the area of the polarizer arranged on a touch panel side of the display panel becomes small, the area of the polarizer to which the touch panel is fixed also becomes small. In such a case, a touch panel is liable to be broken due to a stepped portion which may be caused by a thickness of the polarizer.

FIG. 5 is a view for explaining one example of breaking of such a touch panel. As shown in FIG. 5, in the case of a touch panel which has a hollow region HL between two substrates, when a hollow region HL is fixed in a state where the hollow region HL projects from a polarizer PL2, a crack is liable to occur in a transparent conductive film TR at a portion indicated by a broken line due to a stepped portion formed by the polarizer PL2.

The present invention has been made in view of the above-mentioned drawbacks, and it is an object of the present invention to prevent, in a display device with a touch panel which is laminated to a polarizer and is fixed to a display panel, breaking of a touch panel which occurs due to a stepped portion of the polarizer.

(1) To overcome the above-mentioned drawbacks, according to one aspect of the present invention, there is provided a display device which includes: a display panel having a display screen on which an image is displayed; and a touch panel which is arranged on a display screen side of the display panel, wherein the display panel includes: a first substrate; a second substrate which is arranged on a side closer to the touch panel than the first substrate; and a polarizer which is arranged on a touch panel side of the second substrate, the touch panel is formed larger than the polarizer and is laminated to the polarizer, and an auxiliary member is arranged between the touch panel and a portion of the second substrate which is exposed from the polarizer.

(2) In the display device having the above-mentioned constitution (1), the auxiliary member may be constituted of a resin-made auxiliary member.

(3) In the display device having the above-mentioned constitution (1), the auxiliary member may be constituted of a metal-made auxiliary member, and the metal-made auxiliary member may be formed into a frame shape such that the metal-made auxiliary member surrounds an outer periphery of the polarizer.

(4) In the display device having the above-mentioned constitution (2), the auxiliary member may be constituted of a resin-made auxiliary member and a metal-made auxiliary member, and the metal-made auxiliary member may be formed into a frame shape such that the metal-made auxiliary member surrounds an outer periphery of the polarizer.

(5) In the display device having the above-mentioned constitution (4), the resin-made auxiliary member may be arranged on a side closer to the touch panel than the metal-made auxiliary member.

(6) In the display device having the above-mentioned constitution (5), a total of a thickness of the metal-made auxiliary member and a thickness of the resin-made auxiliary member may be set smaller than a thickness of the polarizer.

(7) In the display device having the above-mentioned constitution (1), a thickness of the auxiliary member may be set smaller than a thickness of the polarizer.

(8) In the display device having the above-mentioned constitution (1), the touch panel may include two substrates and a hollow region which is formed between two substrates, a portion of the hollow region may be arranged so as to extend to the outside beyond the polarizer, and the auxiliary member may be arranged at a position where the auxiliary member overlaps with the portion of the hollow region.

(9) In the display device having the above-mentioned constitution (1), the touch panel may include two substrates formed into a film shape.

According to the present invention, in a display device with a touch panel which is laminated to a polarizer and is fixed to a display panel, it is possible to prevent breaking of the touch panel which may be caused by a stepped portion of the polarizer.

DETAILED DESCRIPTION OF THE INVENTION

Hereinafter, respective embodiments of the present invention are explained in conjunction with drawings.

[First Embodiment]

Figure 1:
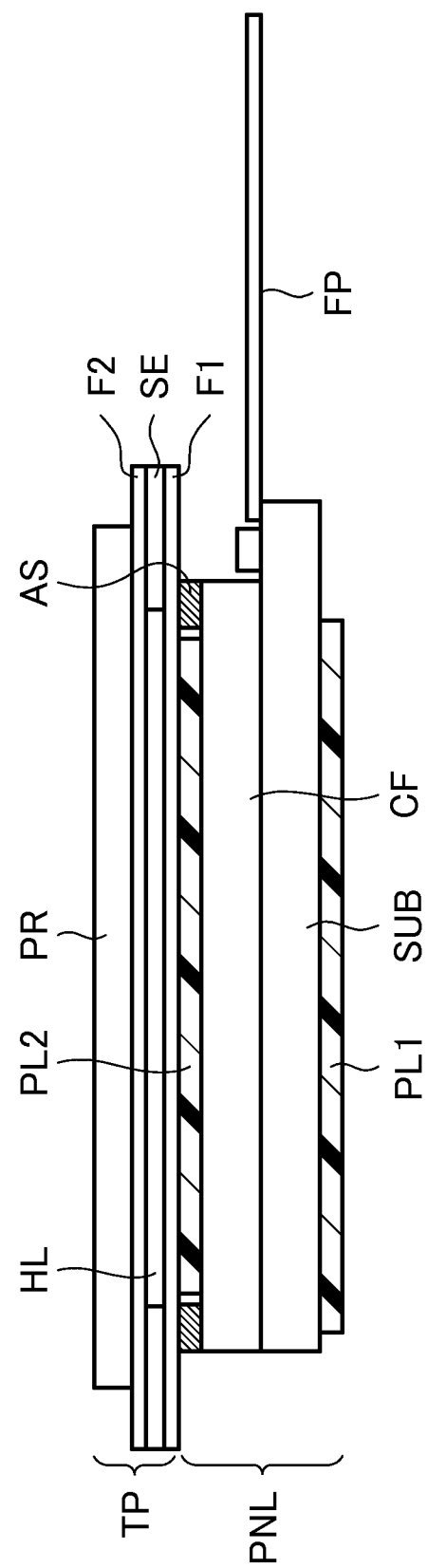
FIG. 1 is a view schematically showing a cross section of a liquid crystal display device according to a first embodiment.

FIG. 1 is a view schematically showing a cross section of a display device according to a first embodiment of the present invention. As shown in the drawing, the display device of this embodiment is constituted of a liquid crystal display panel PNL, a touch panel TP, and a backlight not shown in the drawing. The touch panel TP is arranged on a viewing window side of the liquid crystal display panel PNL.

Firstly, the liquid crystal display panel PNL includes a first substrate SUB and a second substrate CF. The first substrate SUB is a thin film transistor substrate having a plurality of thin film transistors (TFT) formed in a matrix array, and a lower polarizer PL1 is arranged on a backlight side (lower side) of the first substrate SUB. The second substrate CF is a counter substrate which is arranged so as to face the first substrate SUB and has color filters. An upper polarizer PL2 is arranged on a touch panel TP side (upper side) of the second substrate CF.

A power source or a signal is inputted to the liquid crystal display panel PNL via a flexible printed circuit board FP connected to the first substrate SUB and a drive circuit mounted on a picture frame region, and a crystal state of a liquid crystal layer sandwiched between the first substrate SUB and the second substrate CF is controlled for every pixel. Light from the backlight which is incident on the liquid crystal display panel PNL firstly passes through the lower polarizer PL1 as a linear polarized light, and the polarization direction is changed for every pixel according to a crystal state when the polarized light passes through the liquid crystal layer. Then, the light from the liquid crystal layer is allowed to pass through or blocked by the upper polarizer PL2 according to a polarization state of the light so that an image is formed on a display screen.

The upper polarizer PL2 of this embodiment is constituted of a plurality of layers including a polarization layer formed of iodine and a PVA (polyvinyl alcohol) resin. An adhesive layer is formed on both surfaces (that is, the uppermost layer and the lowermost layer) of the upper polarizer PL2, and the uppermost layer constitutes the adhesive layer for fixing the position of the touch panel TP. Further, with respect to the adhesive layer formed on the uppermost layer, for maintaining the favorable degree of flatness of the adhesive layer, it is more desirable to form the adhesive layer using a sheet-like adhesive resin than using an adhesive agent made of a UV curing resin or the like.

Next, the touch panel TP is provided for detecting information on a position of a display image at which an operator touches the display image with his finger, a pen or the like. The touch panel TP of this embodiment includes a lower substrate F1, an upper substrate F2, and a protective layer PR which is formed over the upper substrate F2. The lower surface of the lower substrate F1 of the touch panel TP is adhered and fixed to an adhesive layer of the upper polarizer PL2.

The touch panel of this embodiment is a resistance film type touch panel which is a film/film type touch panel where both the lower substrate F1 and the upper substrate F2 are formed of a film-like substrate made of PET. To be more specific, in the touch panel TP, the electrode structure formed of a transparent conductive film is formed on an upper-side surface of the lower substrate F1 and a lower-side surface of the upper substrate F2 respectively (not shown in the drawing). These two substrates are laminated to each other by a sealing material SE. A large number of insulation bodies which are referred to as dot spacers are arranged between the lower substrate F1 and the upper substrate F2 so as to form a hollow region HL between both substrates F1, F2. When an operator of the touch panel TP depresses the touch panel TP, a depressed position where a transparent conductive film formed on the upper substrate F2 and a transparent conductive film formed on the lower substrate F1 are brought into contact with each other is detected, while when the touch panel TP is not depressed by the operator, short-circuiting between two transparent conductive films is prevented by the dot spacers.

Particularly, as shown in FIG. 1, the touch panel TP of this embodiment has an area larger than an area of the liquid crystal display panel PNL so that the touch panel TP is formed with an area larger than an area of the upper polarizer PL2 in plane. Accordingly, the touch panel TP is fixed to the liquid crystal display panel PNL in a state where a portion of the touch panel TP projects from the upper polarizer PL2. Due to a stepped portion of the upper polarizer PL2, there exists a possibility that the touch panel TP is broken by receiving depressing from an operator or the like. Accordingly, in this embodiment, a resin-made auxiliary member AS is arranged between the second substrate CF and the touch panel TP.

The auxiliary member AS is a member made of PET, and is arranged in a portion of the second substrate CF where the upper polarizer PL2 is not arranged. After the auxiliary member AS is adhered to the second substrate CF, the touch panel TP is mounted on the upper polarizer PL2. Accordingly, the auxiliary member AS is interposed between the portion of the second substrate CF which is exposed from the upper polarizer PL2 and a portion of the touch panel TP which faces the above-mentioned exposed portion of the second substrate CF thus reducing the stepped portion formed between the upper polarizer PL2 and the second substrate CF.

With respect to the auxiliary member AS of this embodiment, ideally, the stepped portion can be eliminated by setting a thickness of the auxiliary member AS equal to a thickness of the upper polarizer PL2. However, to take into account variation in thickness of the auxiliary member AS, it is desirable that the auxiliary member AS is adhered to the second substrate CF by setting a thickness of the auxiliary member AS smaller than a thickness of the upper polarizer PL2. That is, the auxiliary member AS is arranged such that an upper surface of the auxiliary member AS is located in a side closer to the second substrate CF than the upper polarizer PL2. When the thickness of the auxiliary member AS is set larger than the thickness of the upper polarizer PL2 so that the auxiliary member AS projects from the upper polarizer PL2, the touch panel TP is liable to be peeled off from the adhesive layer of the upper polarizer PL2. Accordingly, it is desirable that the auxiliary member AS is thinner than the upper polarizer PL2 by also taking into account the design tolerance thus forming a slight gap between the upper surface of the auxiliary member AS and the touch panel TP.

Further, in this embodiment, the touch panel TP is formed of a film/film type touch panel where a hollow region HL is formed and both the lower substrate F1 and the upper substrate F2 are formed of a film-like substrate. Accordingly, the touch panel TP of this embodiment has the structure which is liable to cause breaking of the transparent conductive film due to the stepped portion of the upper polarizer PL2. Further, a miniaturized liquid crystal display panel and touch panel used in a mobile terminal or the like are required to be strictly designed to achieve the narrowing of a picture frame and hence, in combining the touch panel and the liquid crystal display panel to each other, the stepped portion formed on the upper polarizer PL2 is liable to adversely influence the touch panel TP.

Figure 2:
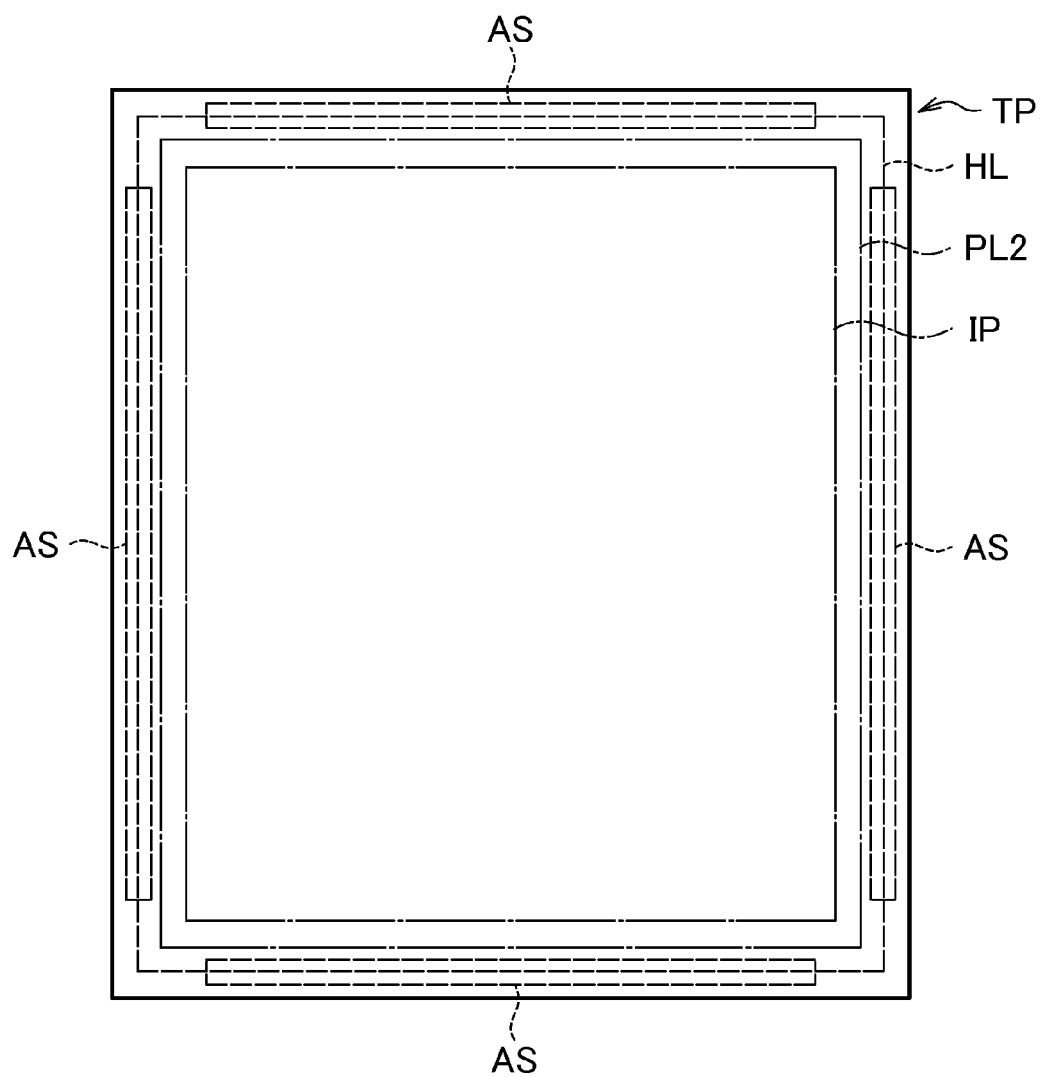
FIG. 2 is a view for explaining the positional relationship among a touch panel, a polarizer and an auxiliary member in the first embodiment.

FIG. 2 is a view for explaining the planar positional relationship among the hollow region HL formed in the touch panel TP, the upper polarizer PL2 arranged in the liquid crystal display panel PNL and the auxiliary member AS in this embodiment. FIG. 2 shows a state of the touch panel TP as viewed from above.

In FIG. 2, an effective region IP where inputting by an operator can be detected, a region where the upper polarizer PL2 is formed, and the hollow region HL formed in the touch panel TP are shown. An outer periphery of the upper polarizer PL2 is provided such that the outer periphery of the upper polarizer PL2 surrounds an outer periphery of the effective region IP, and an outer periphery of the hollow region HL is provided such that the outer periphery of the hollow region HL surrounds an outer periphery of the upper polarizer PL2. The auxiliary member AS of this embodiment is provided at four sides consisting of an upper side, a lower side, a left side and a right side of the upper polarizer PL2 such that the auxiliary members AS overlap with a portion of the hollow region HL which projects and extends to the outside beyond the upper polarizer PL2. In the liquid crystal display panel PNL, it is desirable that a display region for displaying an image is formed on the more inner side of the effective region IP.

In FIG. 2, the hollow region HL formed in the touch panel TP projects from the upper polarizer PL2 in the upper and lower directions as well as in the left and right directions so that the auxiliary member AS is arranged at four sides. However, for example, a rectangular frame-like auxiliary member AS may be arranged so as to surround the upper polarizer PL2. Further, for example, also a case is considered where the hollow region HL formed in the touch panel TP further extends outside from the upper polarizer PL2 in the direction toward a right side in the drawing (toward a side where a flexible printed circuit board FP is connected to the liquid crystal display panel PNL), and the hollow region HL does not extend outside from the upper polarizer PL2 in three other directions. In this case, one auxiliary member AS may be arranged on the side where the hollow region HL extends from the upper polarizer PL2.

[Second Embodiment]

Figure 3:
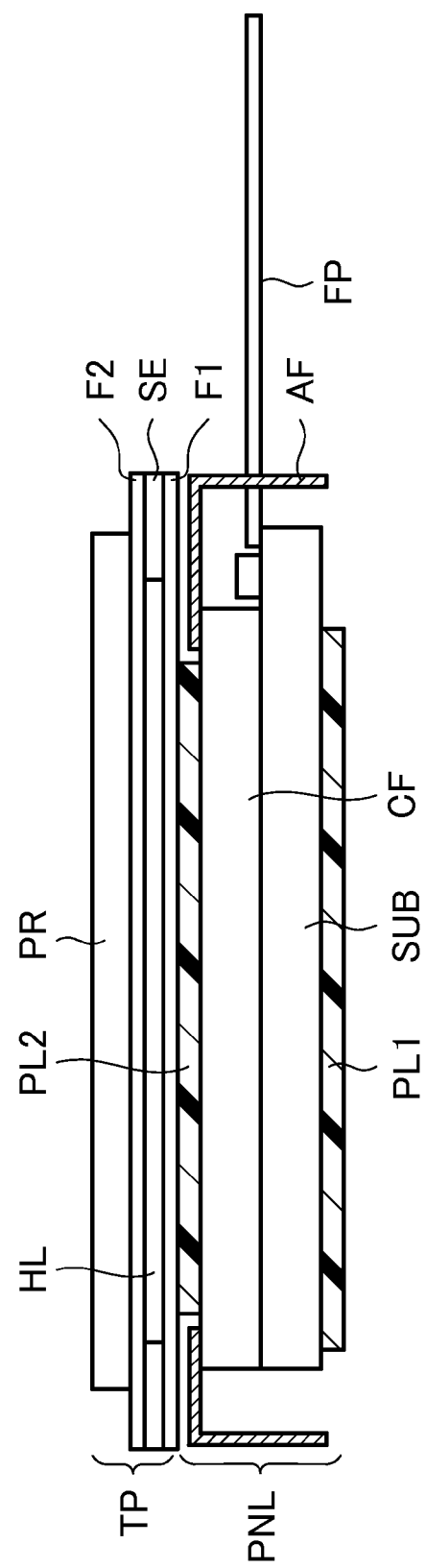
FIG. 3 is a view schematically showing a cross section of a liquid crystal display device according to a second embodiment.

Next, a display device according to the second embodiment of the present invention is explained. The display device according to the second embodiment employs, as shown in FIG. 3, a metal-made auxiliary member AF in place of the resin-made auxiliary member AS. The display device according to the second embodiment differs from the display device of the first embodiment with respect to the above-mentioned constitution, and is substantially equal to the display device of the first embodiment with respect to other constitutions and hence, the explanation of other constitutions is omitted.

The metal-made auxiliary member AF is formed of a frame-like member which is configured to surround an outer edge of an upper polarizer PL2, and a frame-like portion of the auxiliary member AF is made thinner than the upper polarizer PL2 and is arranged between a second substrate CF and a touch panel TP. Further, the metal-made auxiliary member AF of this embodiment has a portion which is bent from the frame-like portion and extends downwardly thus protecting a profile of a liquid crystal display panel PNL.

In the metal-made auxiliary member AF, the frame-like portion of the metal-made auxiliary member AF is formed in an outwardly extending manner from a portion of the second substrate CF exposed from a polarizer. Accordingly, even when depressing is generated at a position away from a stepped portion of the upper polarizer PL2, breaking of the touch panel TP which may be caused by the stepped portion of the upper polarizer PL2 hardly occurs.

[Third Embodiment]

Figure 4:
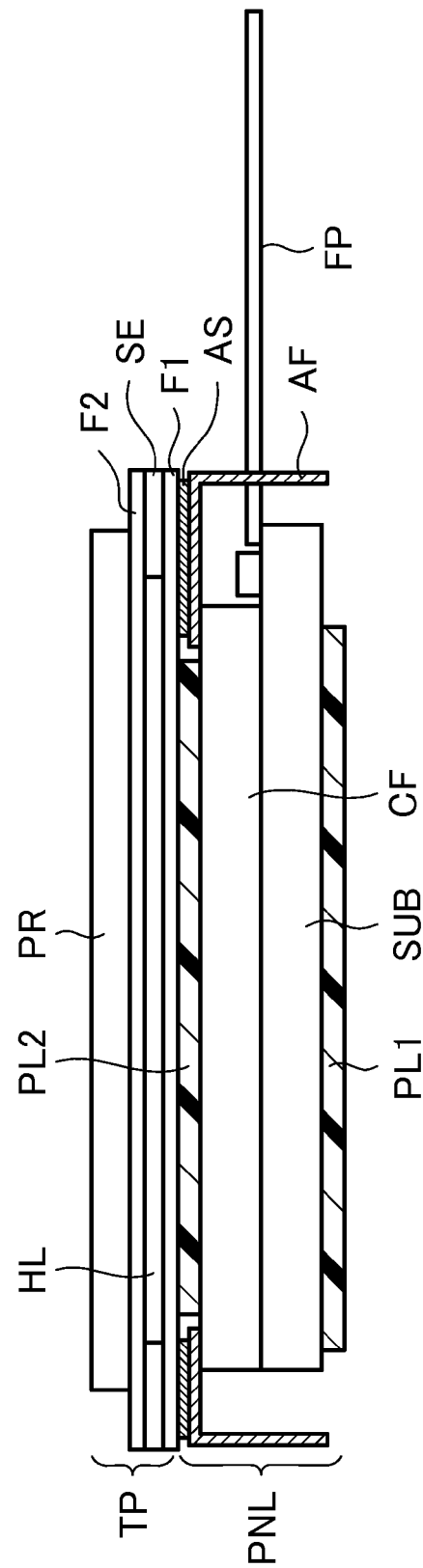
FIG. 4 is a view schematically showing a cross section of a liquid crystal display device according to a third embodiment.
Figure 5:
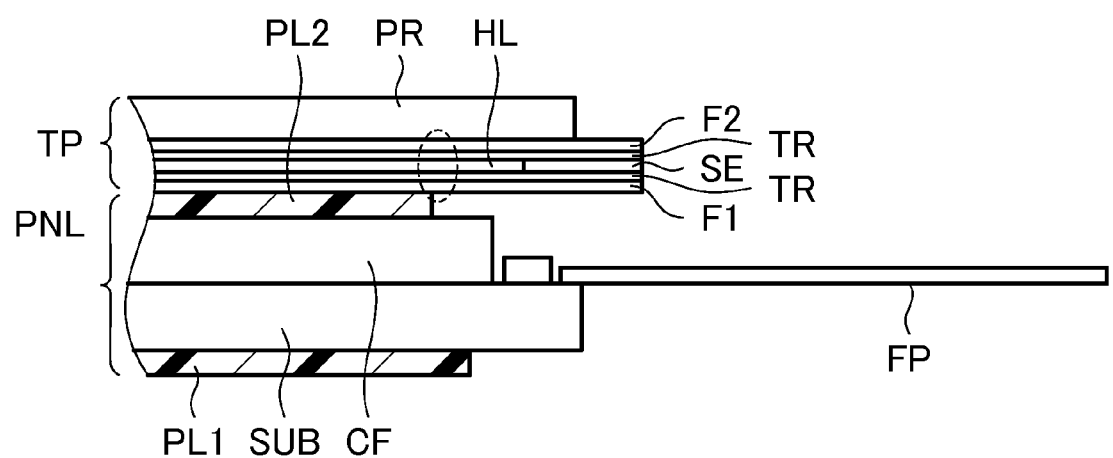
FIG. 5 is a view for explaining one example of breaking which may occur in a touch panel having a hollow region.

Next, a display device according to the third embodiment of the present invention is explained. The display device according to the third embodiment differs from the display device of the second embodiment with respect to the technical feature that, as shown in FIG. 4, a resin-made auxiliary member AS is used in addition to a metal-made auxiliary member AF. The display device of the third embodiment is substantially equal to the display device of the second embodiment with respect to other constitutions and hence, the explanation of other constitutions is omitted.

Firstly, in the same manner as the second embodiment, the metal-made auxiliary member AF is formed of a frame-like member which is configured to surround an outer edge of an upper polarizer PL2, and a frame-like portion is formed parallel to a second substrate CF and is brought into contact with a picture frame region of the second substrate CF.

Particularly, in the third embodiment, the resin-made auxiliary member AS is arranged on a touch panel TP side of the metal-made auxiliary member AF by adhesion. A total thickness of a thickness of the metal-made auxiliary member AF and a thickness of the resin-made auxiliary member AS is set smaller than a thickness of the upper polarizer PL2 so that an upper surface of the resin-made auxiliary member AS is arranged on a side closer to the second substrate CF than an upper surface of the upper polarizer PL2. Further, the metal-made auxiliary member AF is formed in an outwardly extending manner from a portion of the second substrate CF which is exposed from the upper polarizer PL2. Accordingly, the display device according to the third embodiment can ensure a region where the resin-made auxiliary member AS more widely than the display device according to the first embodiment.

The resin-made auxiliary member AS can be brought into contact with the touch panel TP in a state where the resin-made auxiliary member AS is fixed by adhesion to the frame-like portion of the metal-made auxiliary member AF and hence, the resin-made auxiliary member AS alleviates an impact when the touch panel TP is depressed. Further, at the time of forming the metal-made auxiliary member AF, there may be a case where burrs are generated in an edge portion of the frame-like portion of the metal-made auxiliary member AF. When the burrs are generated in an area close to a stepped portion of the upper polarizer PL2, breaking of the touch panel TP is more liable to occur. Accordingly, also from a viewpoint of preventing the burrs from adversely influencing the touch panel TP, as in the case of the third embodiment, it is desirable to further arrange the resin-made auxiliary member AS on a touch panel TP side of the metal-made auxiliary member AF.

In the above-mentioned respective embodiments, the liquid crystal display panel PNL is used as the display panel.

However, the display panel may be formed using an organic EL display panel where a circularly polarizer is arranged on a touch panel TP side, for example. Further, it is needless to say that, as a method for driving the liquid crystal display panel PNL, an IPS (In-Plane-Switching) method may be used or other methods including a VA (Vertical-Alignment) method may be used.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
a display panel having a display screen on which an image is displayed; and
a touch panel which is arranged on a display screen side of the display panel, wherein the display panel includes:
a first substrate; a second substrate which is arranged on a side closer to the touch panel than the first substrate; and
a polarizer which is arranged on a touch panel side of the second substrate, the touch panel is formed larger than the polarizer and is laminated to the polarizer, and
an auxiliary member is arranged between the touch panel and a portion of the second substrate which is exposed from the polarizer,
wherein the auxiliary member has a lowest surface directly disposed on the portion of the second substrate and the auxiliary member is constituted of a resin-made auxiliary member.

2. A display device comprising:
a display panel having a display screen on which an image is displayed; and
a touch panel which is arranged on a display screen side of the display panel, wherein the display panel includes:
a first substrate; a second substrate which is arranged on a side closer to the touch panel than the first substrate; and
a polarizer which is arranged on a touch panel side of the second substrate, the touch panel is formed larger than the polarizer and is laminated to the polarizer, and
an auxiliary member is arranged between the touch panel and a portion of the second substrate which is exposed from the polarizer,
wherein the auxiliary member is constituted of a metal-made auxiliary member, and the metal-made auxiliary member is formed into a frame shape such that the metal-made auxiliary member surrounds an outer periphery of the polarizer.

3. The display device according to claim 1,
wherein the auxiliary member is also constituted of a metal-made auxiliary member, and
the metal-made auxiliary member is formed into a frame shape such that the metal-made auxiliary member surrounds an outer periphery of the polarizer.

4. The display device according to claim 3, wherein the resin-made auxiliary member is arranged on a side closer to the touch panel than the metal-made auxiliary member.

5. The display device according to claim 4, wherein a total of a thickness of the metal-made auxiliary member and a thickness of the resin-made auxiliary member is set smaller than a thickness 15 of the polarizer.

6. The display device according to claim 1, wherein a thickness of the auxiliary member is set smaller than a thickness of the polarizer.

7. A display device comprising:
a display panel having a display screen on which an image is displayed; and
a touch panel which is arranged on a display screen side of the display panel, wherein the display panel includes:
a first substrate; a second substrate which is arranged on a side closer to the touch panel than the first substrate; and
a polarizer which is arranged on a touch panel side of the second substrate, the touch panel is formed larger than the polarizer and is laminated to the polarizer, and
an auxiliary member is arranged between the touch panel and a portion of the second substrate which is exposed from the polarizer,
wherein
the touch panel includes two substrates and a hollow region which is formed between two substrates,
a portion of the hollow region is arranged so as to extend to the outside beyond the polarizer, and
the auxiliary member is arranged at a position where the auxiliary member overlaps with the portion of the hollow region.

8. The display device according to claim 1, wherein the touch panel includes two substrates formed into a film shape.

9. The display device according to claim 1, wherein the auxiliary member has a planer surface on a side of the touch panel.

10. The display device according to claim 1, wherein the auxiliary member has a thickness equal to a distance between the second substrate and the touch panel.

11. The display device according to claim 1, wherein the auxiliary member is arranged so as to surround the polarizer.

* * * * *